E. SETKOWSKI.
LOCKING DEVICE FOR VEHICLES.
APPLICATION FILED JAN. 17, 1921.
1,396,067.　　　　　　　　　　Patented Nov. 8, 1921.
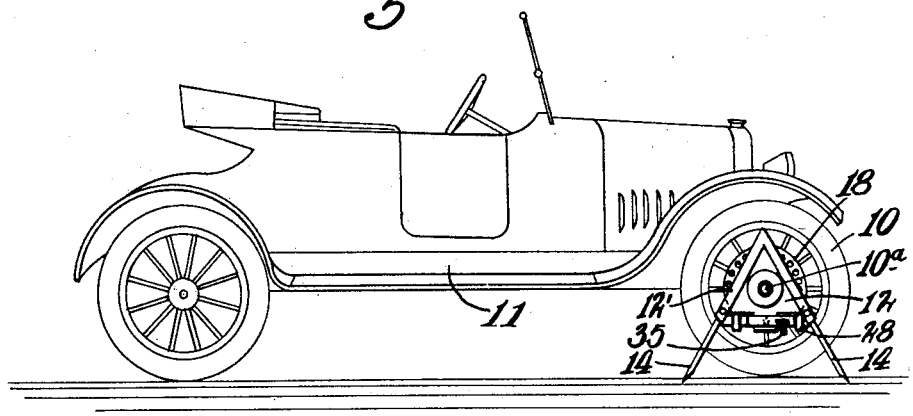
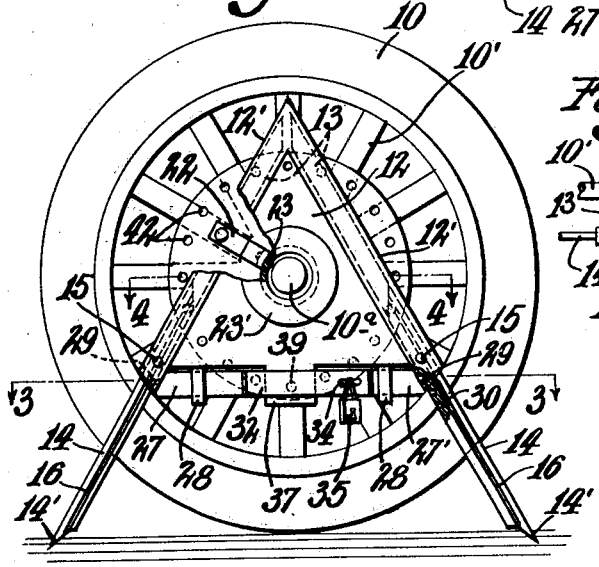
Inventor
Edward Setkowski
By Zoltan F. Polachek
Attorney

UNITED STATES PATENT OFFICE.

EDWARD SETKOWSKI, OF CLIFTON, NEW JERSEY.

LOCKING DEVICE FOR VEHICLES.

1,396,067.

Specification of Letters Patent.  Patented Nov. 8, 1921.

Application filed January 17, 1921. Serial No. 437,782.

*To all whom it may concern:*

Be it known that I, EDWARD SETKOWSKI, citizen of Poland, residing at Clifton, in the county of Passaic and State of New Jersey, have invented certain new and useful Improvements in Locking Devices for Vehicles, of which the following is a specification.

This invention relates to a vehicle locking device adapted to prevent a vehicle such as an automobile from being moved or taken away by thieves or unauthorized persons generally when left unattended.

The invention has for an object to provide a simple device of this sort which can be readily attached or detached, and by engagement with the road or surface on which the automobile is resting, prevents movement of the latter.

For further comprehension of the invention, and of the objects and advantages thereof, reference will be had to the following description and accompanying drawings, and to the appended claims in which the various novel features of the invention are more particularly set forth.

Figure 1 of the drawings is a side view showing the device in position on an automobile.

Fig. 2 is an enlarged side view, with certain exterior parts broken away, showing the device mounted on the wheel of the automobile.

Fig. 3 is a horizontal section on the line 3—3 of Fig. 2, omitting the automobile wheel.

Fig. 4 is a fragmentary horizontal section, taken on the line 4—4 of Fig. 2.

Fig. 5 is a detail perspective view of one of the road engaging stakes.

As here embodied the invention comprises a device adapted to be carried upon one of the wheels of the vehicle and having adjustable elements adapted to engage the road in such a manner as to prevent either backward or forward movement of the automobile.

In the drawings I have shown my improved device applied to the front wheel 10 of an automobile indicated generally at 11. The device as here shown comprises a triangular plate 12 having its lateral edges thickened as at 12', these thickened edges being hollowed out as at 13 to slidably receive the stakes 14 which, when the device is in position diverge downwardly and outwardly and are provided with pointed lower ends 14' adapted to engage in the roadway. To retain the stakes 14 against displacement from the plate elements 12' the latter are provided near their lower ends with pins 15 which project through slots 16 in the stakes.

The plate 12 is adapted to be mounted on the wheel of the automobile as follows: Secured to the outer faces of the spokes 10' of the wheel is a disk 18 having a central aperture 19 to accommodate the usual hub element 10$^a$, this disk being here shown as secured in place by bolts 20 which pass therethrough, through the spokes 10' of the wheel and a ring 21 on the inner faces of the spokes. These bolts 20 also serve to rigidly fix a series of radially disposed rigid straps 22 to the disk 18, these straps having secured to their inner ends a sleeve 23 concentric with the wheel and whose inside diameter corresponds to that of the opening 19 and is somewhat greater than the hub element 10$^a$.

This sleeve 23 is adapted to have the plate 12 freely mounted thereon, as most clearly shown in Fig. 4, the plate having a central aperture to receive the sleeve, while the latter has an outer circumferential flange 23' which retains the plate against outward displacement. Inward movement of the plate 12 along the sleeve 23 is prevented by the straps 22 which are bent outwardly as shown from the disk 18 and then inwardly as at 22' parallel to the wheel axis, these inturned ends 22' having the sleeve 23 riveted thereto as at 25.

To lock the stakes 14 in their lowered position, engaging the roadway, I provide a pair of horizontally disposed and alined bolts 27 and 27' which are slidably held in guides 28 depending from the bottom of the plate 12, these bolts having diminished heads 29 on their outer ends, while the stakes 14 have each a series of sockets 30 spaced along their adjacent edges adapted to receive these heads.

To lock these bars 27 and 27' in position with their heads 29 engaging in the sockets 30 I provide on the bolt 27 a heavy hasp 32 which is hinged to the bolt at one end as at 33 and is provided at its opposite end with the usual slotted aperture to receive a staple 34 fixed on the opposite bolt 27', displacement of the hasp from the staple being prevented by a padlock 35 which is engaged with the latter in the usual manner.

Projecting downwardly from the plate 12 is an ear 37 having a tapped aperture into which is screwed the diminished end of a barrel 38 through which extends a plunger pin 39 having a fixed collar 40 midway between its ends. One end of this pin 39 normally projects from the barrel outwardly from the general plane of the wheel, being held in this position by a spring 41 coiled around the pin 39 and bearing between the inner end of the barrel and the collar. The inner end of the pin 39, when in this position is just clear of the face of the disk 18 in which are a number of holes 42. The hasp 32, when in closed position, extends across the ear 37 and is adapted to engage the outer end of pin 39 and force the opposite end into one of the perforations 42 in the disk 18, thus holding the device against swinging movement around the wheel hub.

It is believed that the manner of use of my improved device will be readily understood from the above description. When the device is not in use, the plate 12 may be inverted from its operative position after the bolt heads 29 in the stakes 14 and the latter have been telescoped into the borings 13. The hasp 32 may then again be locked, moving pin 39 into the top perforation of disk and holding the plate against swinging movement.

Having thus described my invention what I claim as new and desire to protect by Letters Patent of the United States is as follows—

1. A device of the class described, comprising a member adapted for mounting on the wheel of a vehicle, a pair of stakes adjustably carried by said member and inclining one downwardly and forwardly and the other downwardly and rearwardly, and means for locking said stakes in adjusted positions.

2. A device of the class described, comprising a member adapted for mounting on the wheel of a vehicle, a pair of stakes adjustably carried by said member and inclining one downwardly and forwardly and the other downwardly and rearwardly, and means for locking said stakes in adjusted positions, said means comprising a pair of bolts slidable on said member and adapted to engage said stakes.

3. A device of the class described, comprising a member adapted for mounting on the wheel of a vehicle, a pair of stakes adjustably carried by said member and inclining one downwardly and forwardly and the other downwardly and rearwardly, and means for locking said stakes in adjusted positions, said means comprising a pair of bolts slidable on said member and adapted to engage said stakes, said bolts having diminished heads, and said stakes presenting sockets spaced therealong in which said diminished heads are adapted to engage.

4. A device of the class described comprising a triangular plate adapted for mounting on the wheel of a vehicle, said plate having its side edges thickened and hollowed out, a pair of stakes telescopically mounted in said edges, and a pair of bolts adapted to engage said stakes to lock them in adjusted positions.

5. A device of the class described comprising a triangular plate adapted for mounting on the wheel of a vehicle, said plate having its side edges thickened and hollowed out, a pair of stakes telescopically mounted in said edges, and a pair of bolts adapted to engage said stakes to lock them in adjusted positions, said stakes being formed with longitudinal slots, and said edges having pins projecting through said slot, for the purpose set forth.

6. A device of the class described comprising a triangular plate adapted for mounting on the wheel of a vehicle, stakes telescopically carried by the side edges of said plate, a pair of bolts slidable along the lower edge of said plate for locking said stakes in adjusted positions, means including a hinged hasp for retaining said bolts in locking position, a disk adapted to be fixed on the vehicle wheel, and having a series of apertures spaced circularly therearound, and a pin slidably carried by said plate and adapted to be moved into a registering one of said apertures.

In testimony whereof I have affixed my signature.

EDWARD SETKOWSKI.